US012134264B2

(12) United States Patent
Wakasa et al.

(10) Patent No.: US 12,134,264 B2
(45) Date of Patent: Nov. 5, 2024

(54) PRINTER AND METHOD OF CONTROLLING THE SAME

(71) Applicant: SEIKO EPSON CORPORATION, Tokyo (JP)

(72) Inventors: Shunichi Wakasa, Chikuma (JP); Toshiyuki Ito, Nagawa-machi (JP); Akihiko Tsuchiya, Tomi (JP)

(73) Assignee: Seiko Epson Corporation, Tokyo (JP)

( * ) Notice: Subject to any disclaimer, the term of this patent is extended or adjusted under 35 U.S.C. 154(b) by 218 days.

(21) Appl. No.: 18/045,511

(22) Filed: Oct. 11, 2022

(65) Prior Publication Data

US 2023/0111450 A1 Apr. 13, 2023

(30) Foreign Application Priority Data

Oct. 13, 2021 (JP) ................................ 2021-167891

(51) Int. Cl.
*B41J 11/66* (2006.01)

(52) U.S. Cl.
CPC .................................. *B41J 11/663* (2013.01)

(58) Field of Classification Search
CPC ....... B41J 11/663; B41J 11/70; B41J 11/0095; B41J 11/46; B41J 15/042; B26D 5/20; B65H 2701/13
See application file for complete search history.

(56) References Cited

U.S. PATENT DOCUMENTS

2010/0245514 A1* 9/2010 Kaimoto ................ B41M 5/504 427/256
2016/0027222 A1 1/2016 Kurihara
2020/0307272 A1* 10/2020 Suzuki ..................... B41J 11/66

FOREIGN PATENT DOCUMENTS

JP 2016-22733 A 2/2016

* cited by examiner

*Primary Examiner* — Thinh H Nguyen
(74) *Attorney, Agent, or Firm* — WORKMAN NYDEGGER

(57) ABSTRACT

A printer includes: a transport roller for transporting recording paper in a transport direction; a head for printing on the recording paper; a cutter disposed downstream of the head in the transport direction and configured to cut the recording paper; a first sensor disposed downstream of the cutter in the transport direction and configured to detect the recording paper; a communication section configured to receive print data; and a controller. The controller detects the recording paper by using the first sensor at least at startup, when the recording paper is detected, the recording paper is transported by the transport roller and is cut by the cutter, whereas when the recording paper is not detected, the recording paper is not transported by the transport roller and is not cut by the cutter, and when the communication section receives the print data, the controller performs printing on the recording paper by using the head.

6 Claims, 4 Drawing Sheets

PRINTER AND METHOD OF CONTROLLING THE SAME

The present application is based on, and claims priority from JP Application Serial Number 2021-167891, filed Oct. 13, 2021, the disclosure of which is hereby incorporated by reference herein in its entirety.

BACKGROUND

1. Technical Field

The present disclosure relates to a printer and a method of controlling the same.

2. Related Art

As described in JP-A-2016-22733, a device is known that transports recording paper, which is a medium, at every startup so that the first boarding pass is cut off manually or with a cutter and discarded.

With the device described above, the recording paper is wasted every time the device is started.

SUMMARY

According to an aspect of the present disclosure, there is provided a printer including: a transport roller for transporting recording paper in a transport direction; a head for printing on the recording paper; a cutter disposed downstream of the head in the transport direction and configured to cut the recording paper; a first sensor disposed downstream of the cutter in the transport direction and configured to detect the recording paper; a communication section configured to receive print data; and a controller. The controller detects, by the first sensor, the recording paper at least at startup, when the recording paper is detected, the controller causes the transport roller to transport the recording paper and causes the cutter to cut the recording paper, whereas when the recording paper is not detected, the controller causes the transport roller not to transport the recording paper and causes the cutter not to cut the recording paper, and when the communication section receives the print data, the controller causes the head to print on the recording paper.

According to another aspect of the present disclosure, there is provided a method of controlling a printer including a transport roller for transporting recording paper in a transport direction, a head for printing on the recording paper, a cutter disposed downstream of the head in the transport direction and configured to cut the recording paper, a first sensor disposed downstream of the cutter in the transport direction and configured to detect the recording paper, and a communication section configured to receive print data, the method including: detecting the recording paper by the first sensor at least at startup of the printer, when the recording paper is detected, transporting the recording paper and cutting the recording paper, whereas when the recording paper is not detected, not transporting the recording paper and not cutting the recording paper, and when the print data is received, printing on the recording paper.

DESCRIPTION OF EXEMPLARY EMBODIMENTS

1. First Embodiment

1.1 Printer Configuration

In the following, a description will be given of a printer 1 according to an embodiment with reference to FIGS. 1 to 4. In this regard, a description will be given of the directions in FIG. 2 by using a three-dimensional coordinate system. For convenience of explanation, the positive direction of Z-axis is referred to as the up direction or simply upward, and the negative direction thereof is referred to as the down direction or simply downward. The positive direction of X-axis is referred to as the right direction or simply rightward, and the negative direction is referred to as the left direction or simply leftward. The positive direction of Y-axis is referred to as the back direction or simply backward, and the negative direction thereof is referred to as the front direction or simply forward.

The printer 1 according to the embodiment is used for, for example, a POS (point of sale) system. A POS system is a system used for retail business, such as a shopping center, a department store, a convenience store, in-car sales, and the like, and for restaurant business, such as a restaurant, a coffee shop, a bar, and the like. A POS system has a function of printing a receipt, a coupon, a ticket, a label, and the like in accordance with a product and a service. Hereinafter, a receipt, a coupon, a ticket, a label, and the like are referred to as printed matter. A user operates a POS system, transmits print data from a computer to the printer 1, and prints printed matter by using the printer 1 so as to hand the printed matter to a customer, or to attach the printed matter to a product. The printed matter is printed with a fixed size.

Figure 1:
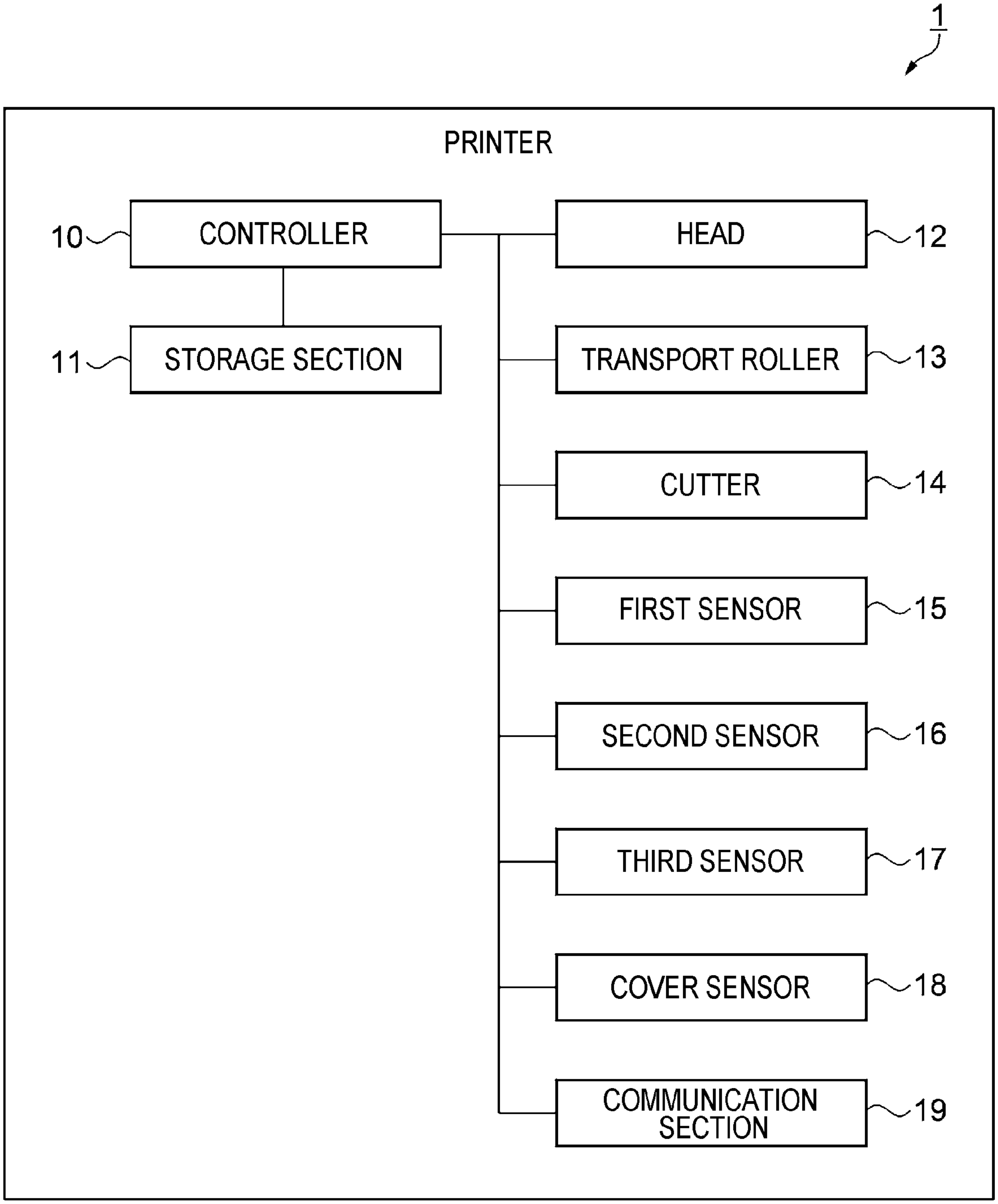
FIG. 1 is a block diagram illustrating the configuration of a printer.

As illustrated in FIG. 1, the printer 1 according to the first embodiment includes a controller 10, a storage section 11, a head 12, a transport roller 13, a cutter 14, a first sensor 15, a second sensor 16, a third sensor 17, a cover sensor 18, and a communication section 19.

The controller 10 includes a CPU (central processing unit) that integrally controls each section of the printer 1, a UART (universal asynchronous receiver-transmitter) that manages input and output, an FPGA (field programmable gate array) and a PLD (programmable logic device), which are logic circuits, and the like. A CPU is also referred to as a processor. When a power switch not illustrated in FIG. 1 is turned on to supply power to the printer 1, the controller 10 is started. More specifically, the CPU of the controller 10 is started. Hereinafter, starting the controller 10 is also referred to as starting the printer 1.

The storage section 11 includes a flash ROM (read only memory), which is a rewritable nonvolatile memory, an HDD (hard disk drive), a RAM (random access memory), which is a volatile memory, and the like. The CPU of the controller 10 reads a program, such as firmware and setting information stored in the nonvolatile memory of the storage section 11 and executes the program by using the RAM of the storage section 11 as a work area.

The communication section 19 includes a circuit communicatable with an external device, such as a computer, a mobile terminal, or the like in a wireless or wired manner. The communication section 19 receives print data and a command from the external device. Also, the communication section 19 transmits error information to the external device when an error occurs. The controller 10 prints the print data received by the communication section 19 by using the head 12.

Figure 2:
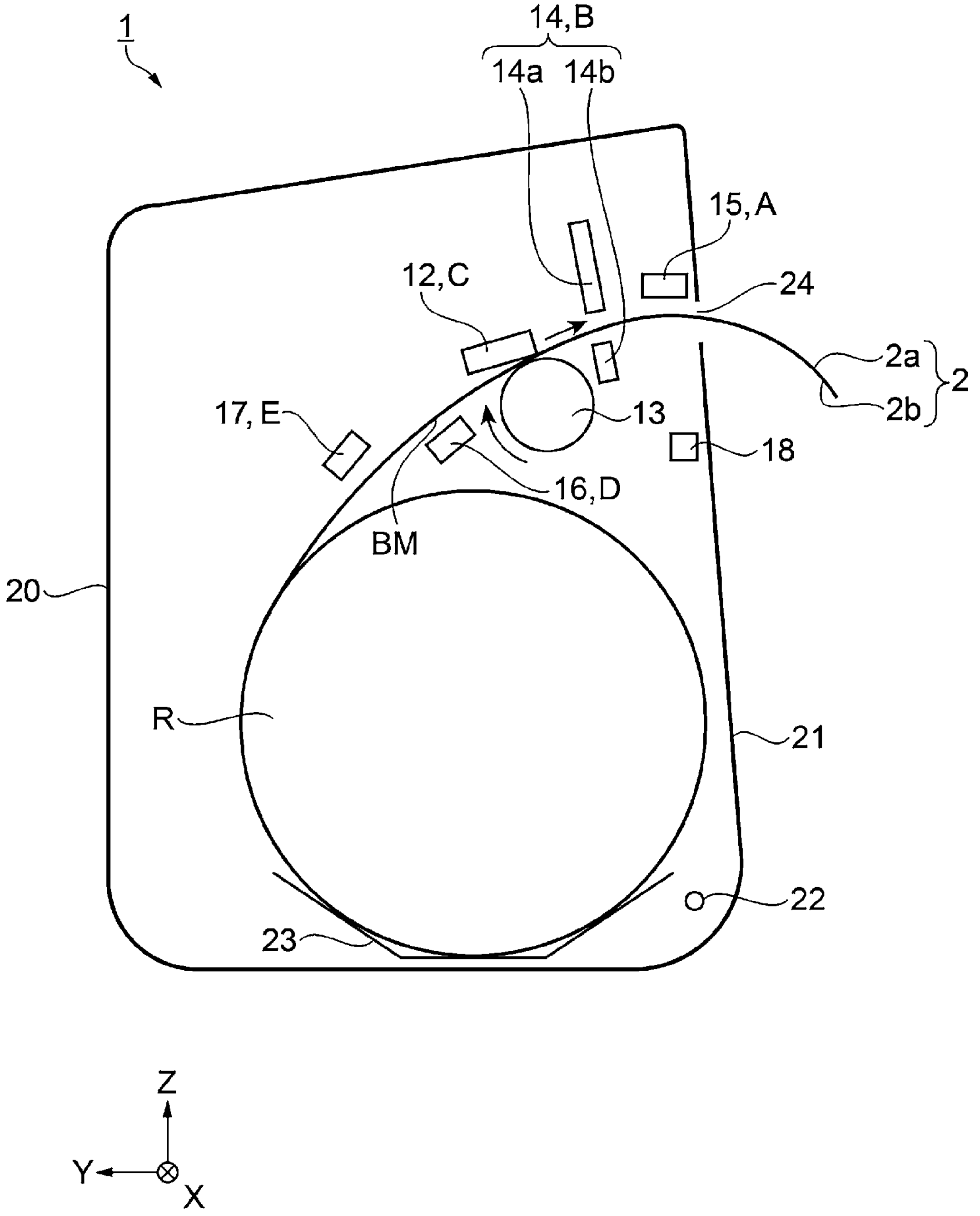
FIG. 2 is a sectional view illustrating the configuration of the printer.

As illustrated in FIG. 2, recording paper 2 is, for example, lengthy thermal paper. Thermal material is applied on a front face 2*a*, which is a first face. So-called plurality of black marks, which are rectangular black marks, are put on a back side 2*b*, which is a second face by printing, or the like. Hereinafter, black marks are referred to marks BM. In this regard, when the marks are detected, for example, by an optical sensor as described later, the marks BM may have any color as long as the color that absorbs detection light of the optical sensor, and thus the marks BM may have a color other than black.

Also, the recording paper 2 may be a so-called die-cut label having a front face 2*a* with a plurality of fixed-form labels pasted on backing paper. In this case, the marks BM are attached to the backing paper on a back side 2*b*. Also, the recording paper 2 may be a so-called linerless label, which is a lengthy continuous label without backing paper. In this case, the marks BM are attached to a back side 2*b* on which glue is applied. In the case of linerless label, the front face of the transport roller 13 is subjected to non-adhesive processing, such as silicon resin processing, or the like such that glue does not adhere thereto.

As illustrated in FIG. 2, a roll paper R having the recording paper 2 wound thereon is accommodatable in a holder 23 disposed on the down direction side in a case 20. The case 20 is provided with a hinge 22 disposed at a position on the down direction side and the front direction side. The cover 21 is rotatably mounted around the hinge 22. The cover 21 is configured to open and close the holder 23. It is possible for a user to open the cover 21 forward to access the holder 23, and accommodate the roll paper R in the holder 23. On the front direction side in the case 20, a cover sensor 18 configured to detect opening and closing of the cover 21 is disposed. The cover sensor 18 is, for example, a mechanical switch, or a transmissive or reflective optical sensor.

In this regard, components, such as the transport roller 13, the second sensor 16, a second blade 14*b* described later included in the cutter 14, and the like are mounted on the cover 21. On the other hand, components, such as, the holder 23, the first sensor 15, the head 12, a first blade 14*a* described later included in the cutter 14 are mounted on the case 20. With the open operation of the cover 21 by a user, the components mounted on the cover 21 are separated from the components mounted on the case 20. As a result, a gap between the components mounted on the cover 21 and the components mounted on the case 20 becomes a wide opening. By this opening, it becomes possible for the user to access the holder 23.

When the user opens the cover 21, accommodates the roll paper R in the holder 23, pulls out the recording paper 2 from the roll paper R, and closes the cover 21, it is possible for the user to set the recording paper 2 in the printer 1. As illustrated in FIG. 2, when the user closes the cover 21, the transport roller 13 mounted on the cover 21 is located at the position facing the head 12 mounted on the case 20 with the recording paper 2 interposed therebetween. As a result, the transport roller 13 becomes possible to transport the recording paper 2, and the head 12 becomes possible to print on the recording paper 2. Also, the second blade 14*b* of the cutter 14 mounted on the cover 21 is located at the position facing the first blade 14*a* mounted on the case 20 with the recording paper 2 interposed therebetween, and becomes possible to cut the recording paper 2. Also, when the user closes the cover 21, a discharge opening 24, which is a rectangular shaped opening, is formed on the border between the cover 21 and the case 20.

The head 12 is a line-type thermal head in which a plurality of heating elements are horizontally arranged. The plurality of heating elements of the head 12 are selectively heated based on print data, and print an image on the recording paper 2, which is thermal paper. The transport roller 13 is rotated clockwise, as denoted by an arrow, by a transport motor not illustrated in FIG. 2. The transport roller 13 transports the recording paper 2 in the transport direction denoted by an arrow from the head 12 to the cutter 14. The transport roller 13 located facing the head 12 via the recording paper 2 is also referred to as a platen roller.

In this regard, the printer 1 may include a pressing mechanism that presses the head 12 to the transport roller 13. The recording paper 2 becomes a pressed state between the head 12 and the transport roller 13 with a predetermined pressure by the pressing mechanism. When the transport roller 13 is rotated in this state, a predetermined friction force occurs between the transport roller 13 and the recording paper 2 so as to transport the recording paper 2.

The cutter 14 is disposed downstream of the head 12 and the transport roller 13 in the transport direction. The cutter 14 includes the first blade 14*a* and the second blade 14*b*. The recording paper 2 is transported by the transport roller 13 so as to pass between the first blade 14*a* and the second blade 14*b*. The first blade 14*a* moves to the second blade 14*b* by a cutting motor not illustrated in FIG. 2 so as to cut the recording paper 2 located between the first blade 14*a* and the second blade 14*b*.

As illustrated in FIG. 2, the first sensor 15 is disposed downstream of the cutter 14 in the transport direction. The first sensor 15 detects presence or absence of the recording paper 2 between the cutter 14 and the discharge opening 24. When the recording paper 2 is present, the first sensor 15 detects presence. The first sensor 15 is, for example, a transmissive or reflective optical sensor. In FIG. 2, the first sensor 15 is mounted on the case 20, but may be mounted on the cover 21. In this regard, the first sensor 15 has a function to detect whether the printed and cut recording paper 2 has been taken out by the user, and thus the first sensor 15 is also referred to as a taken sensor.

Incidentally, when a user opens the cover 21, the head 12 and the transport roller 13 between which the recording paper 2 is pressed are separated. The recording paper 2 changes the position thereof because it is not pressed by the head 12 and the transport roller 13. Opening the cover 21 by the user may be the case when the user replaces with another roll paper R, or the like. In this manner, when the user opens the cover 21, the position of the recording paper 2 changes. After that, when the user closes the cover 21, the recording paper 2 becomes pressed by the head 12 and the transport roller 13 in a state in which the position has been changed.

At this time, the recording paper 2 is located between the cutter 14 and the discharge opening 24 so that the first sensor 15 detects the recording paper 2. When the user sets the recording paper 2, the user pinches the recording paper 2 with fingers, pulls out the recording paper 2 from the roll paper R, and closes the cover 21. Accordingly, the recording paper 2 becomes a state of protruding from the discharge opening 24.

On the other hand, when the recording paper 2 is located at a cue position described later, there is no recording paper 2 between the cutter 14 and the discharge opening 24, and thus the first sensor 15 does not detect the recording paper 2. Also, the recording paper 2 is printed by the head 12 based on the print data, cut by the cutter 14, and discharged by the discharge opening 24. At this time, there is no recording paper 2 between the cutter 14 and the discharge opening 24, and thus the first sensor 15 does not detect the recording paper 2. In these cases, the position of the recording paper 2 is not changed.

When the controller 10 detects the recording paper 2 by using the first sensor 15 at the time of startup, it is possible for the controller 10 to determine that the cover 21 has been opened and closed while the power switch is turned off so that the position of the recording paper 2 has been changed. Also, when the cover sensor 18 detects opening and closing of the cover 21 after startup, it is possible for the controller 10 to determine that the position of the recording paper 2 has been changed. In this regard, when the controller 10 detects opening and closing of the cover 21 by using the cover sensor 18, and then detects the recording paper 2 by using the first sensor 15, the controller 10 may determine that the position of the recording paper 2 has been changed.

The second sensor 16 detects a mark BM put on the back side 2*b* of the recording paper 2 between the holder 23, and the head 12 and transport roller 13. When there is a mark BM, the second sensor 16 detects the presence. The second sensor 16 is, for example, a reflective optical sensor configured to receive detection light, such as infrared rays to be absorbed by the mark BM, or the like, and is mounted on the cover 21. In this regard, since the second sensor 16 detects a mark BM put on the recording paper 2, the second sensor 16 is also referred to as a mark sensor.

It is possible for the controller 10 to detect a mark BM put on the recording paper 2 by using the second sensor 16, and to determine the position of the recording paper 2. It is possible for the controller 10 to transport the recording paper 2 by using the transport roller 13 while detecting a mark BM of the recording paper 2 by the second sensor 16, and to transport the recording paper 2 to a target position.

The third sensor 17 detects presence or absence of the recording paper 2 between the holder 23, and the head 12 and the transport roller 13. When there is the recording paper 2, the third sensor 17 detects the presence. The third sensor 17 is, for example, a mechanical switch, or a transmissive or reflective optical sensor. In FIG. 2, the third sensor 17 is mounted on the case 20, but may be mounted on the cover 21. In this regard, since the third sensor 17 detects presence or absence of the recording paper 2, the recording paper 2 may be referred to as a paper sensor.

When the third sensor 17 detects the recording paper 2, it is possible for the controller 10 to determine that the roll paper R is accommodated in the holder 23, and the recording paper 2 is pressed between the head 12 and the transport roller 13. That is to say, it is possible for the controller 10 to determine that the recording paper 2 is possible to be printed by the head 12, to be transported by the transport roller 13, and to be cut by the cutter 14. On the other hand, when the controller 10 does not detect the recording paper 2 by using the third sensor 17, it is possible for the controller 10 to determine that an error has occurred due to absence of the recording paper 2 in the printer 1.

Here, a description will be given of the positional relationship among the components of the printer 1 in the transport direction of the recording paper 2 with reference to FIG. 2.

The third sensor 17 is disposed at a position E, which is downstream of the holder 23 in the transport direction and upstream of the head 12 and the transport roller 13, and detects presence or absence of the recording paper 2. The second sensor 16 is disposed at a position D, which is downstream of the holder 23 in the transport direction and upstream of the head 12 and the transport roller 13, and detects a mark BM on the back side 2*b* of the recording paper 2. In this regard, in FIG. 2, the second sensor 16 is located downstream of the third sensor 17 in the transport direction. However, the second sensor 16 may be located upstream of the third sensor 17.

The head 12 and the transport roller 13 are disposed at a position C, which is downstream of the second sensor 16 and the third sensor 17 in the transport direction, and upstream of the cutter 14, and performs printing on the recording paper 2 and transports the recording paper 2. In this regard, as described above, when the cover 21 is closed, the head 12 and the transport roller 13 have the positions facing with each other.

The cutter 14 is disposed at a position B, which is downstream of the head 12 in the transport direction and upstream of the first sensor 15, and moves the first blade 14*a* to the second blade 14*b* to cut the recording paper 2. In this regard, as described above, when the cover 21 is closed, the first blade 14*a* and the second blade 14*b* have the positions facing with each other.

The first sensor 15 is disposed at a position A, which is downstream of the cutter 14 in the transport direction and upstream of the discharge opening 24, and detects presence or absence of the recording paper 2. In this regard, the first sensor 15 may be mounted outside the discharge opening 24, such as on the front face of the case 20, the cover 21, or the like.

Figure 3:
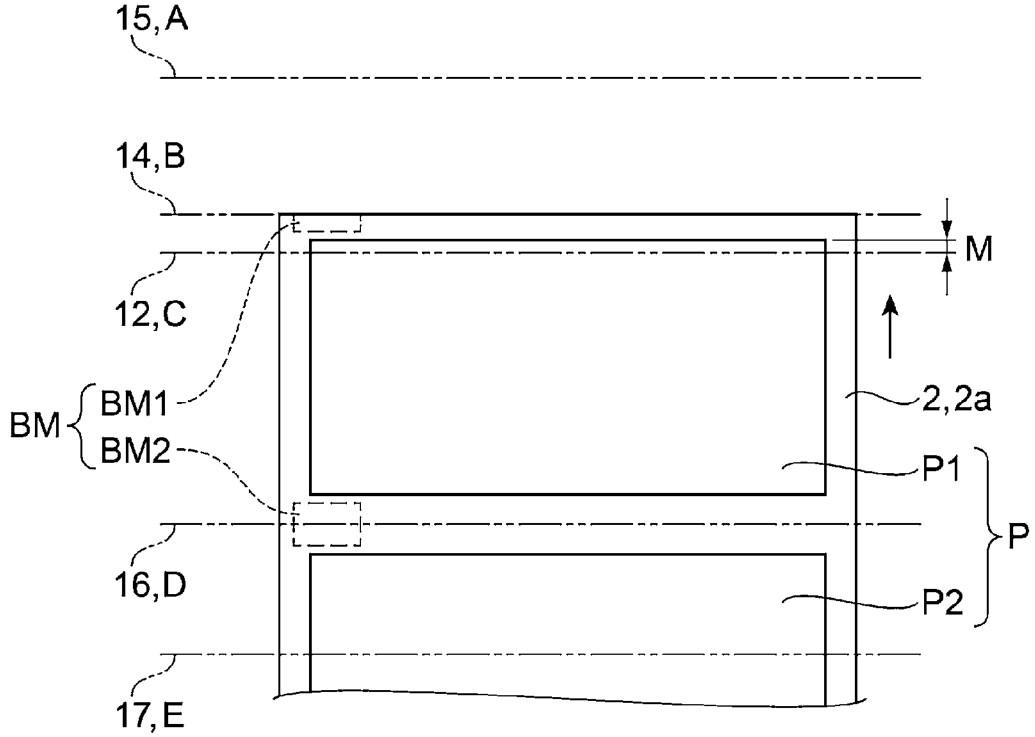
FIG. 3 is a schematic diagram illustrating the positional relationship between recording paper and each component.

FIG. 3 illustrates the positional relationship between the recording paper 2 and each component when the recording paper 2 is located at the cue position described later. The recording paper 2 is in a state of having been cut by the cutter 14. In this regard, an arrow illustrated in FIG. 3 denotes the transport direction. As illustrated in FIG. 3, each component is disposed in the order from the upstream to the downstream in the transport direction, namely, the position E of the third sensor 17 for detecting presence or absence of the recording paper 2, the position D of the second sensor 16 for detecting a mark BM on the back side 2*b* of the recording paper 2, the position C of the head 12 for printing on the front face 2*a* of the recording paper 2, the position B of the cutter 14 for cutting the recording paper 2, and the position A of the first sensor 15 for detecting presence or absence of the recording paper.

A print area P illustrated in FIG. 3 is an area in which the head 12 prints printed matter on the front face 2*a* of the recording paper 2 in a fixed size. It is assumed that a print area P1 and a print area P2 are located from the downstream to the upstream in the transport direction in the print area P. Also, hereinafter, the end of the downstream of the print area P in the transport direction is referred to as an end of the print area P.

The head 12 is located at the position C with a margin M from the end of the print area P1, and configured to start printing in the print area P1. The position at which the controller 10 targets the recording paper 2, such as the position at which the head 12 starts printing in the print area P1, or the like is referred to as the so-called cue position. Also, the operation that the controller 10 transports the recording paper 2 to the cue position by using the transport roller 13 is referred to as a so-called cue operation.

Since there is no recording paper 2 at the position A of the first sensor 15, the first sensor 15 does not detect the recording paper 2. In this regard, the margin M may not be disposed in the print area P1. In this case, the end of the print area P1 is the position at which the head 12 starts printing. Since the first sensor 15 does not detect the recording paper 2, it is possible for the controller 10 to determine that the position of the recording paper 2 has not been changed. The controller 10 then does not transport the recording paper 2 by using the transport roller 13 unlike the case of FIG. 4 described later. Also, the controller 10 does not cut the recording paper 2 by using the cutter 14.

In this regard, since it is possible for the third sensor 17 to detect the recording paper 2 at the position E, the controller 10 does not yield an error due to absence of the recording paper 2 in the printer 1, and performs processing on the recording paper 2. A detailed description will be given of the role of the third sensor 17. When there is a mark BM at the position of the second sensor 16, detection light from the second sensor 16 is absorbed by the mark BM and is not reflected. This state is the same as the case in which the detection light is not reflected due to absence of the recording paper 2 at the position of the second sensor 16. Accordingly, the controller 10 sometimes finds it different to determine whether or not there is the recording paper 2 in the printer 1 only by using the second sensor 16. Accordingly, by detecting the recording paper 2 by using the third sensor 17, it is possible for the controller 10 to determine whether or not there is the recording paper 2 in the printer 1.

On the back side 2*b* of the recording paper 2, marks BM are put between individual print areas P. In FIG. 3, regarding the marks BM, a mark BM1 and a mark BM2 are located from the downstream to the upstream in the transport direction. Hereinafter, the downstream end of the mark BM in the transport direction is referred to as an end of the mark BM. In the example illustrated in FIG. 3, the second sensor 16 is located at the position having a half the length of the mark BM2 of the recording paper 2 in the transport direction. The second sensor 16 detects the mark BM2 at the position D.

The head 12 prints each one piece of printed matter in the order of the print area P1 and the print area P2. Also, the cutter 14 cuts the recording paper 2 between the print area P1 and the print area P2. The mark BM2 is located between the print area P1 and print area P2. When the controller 10 receives print data by using the communication section 19, the controller 10 print the print data in the print area P1 of the recording paper 2 by using the head 12, cuts the recording paper 2 by using the cutter 14 at the position of the mark BM2, and issues printed matter having been printed in the print area P1.

Figure 4:
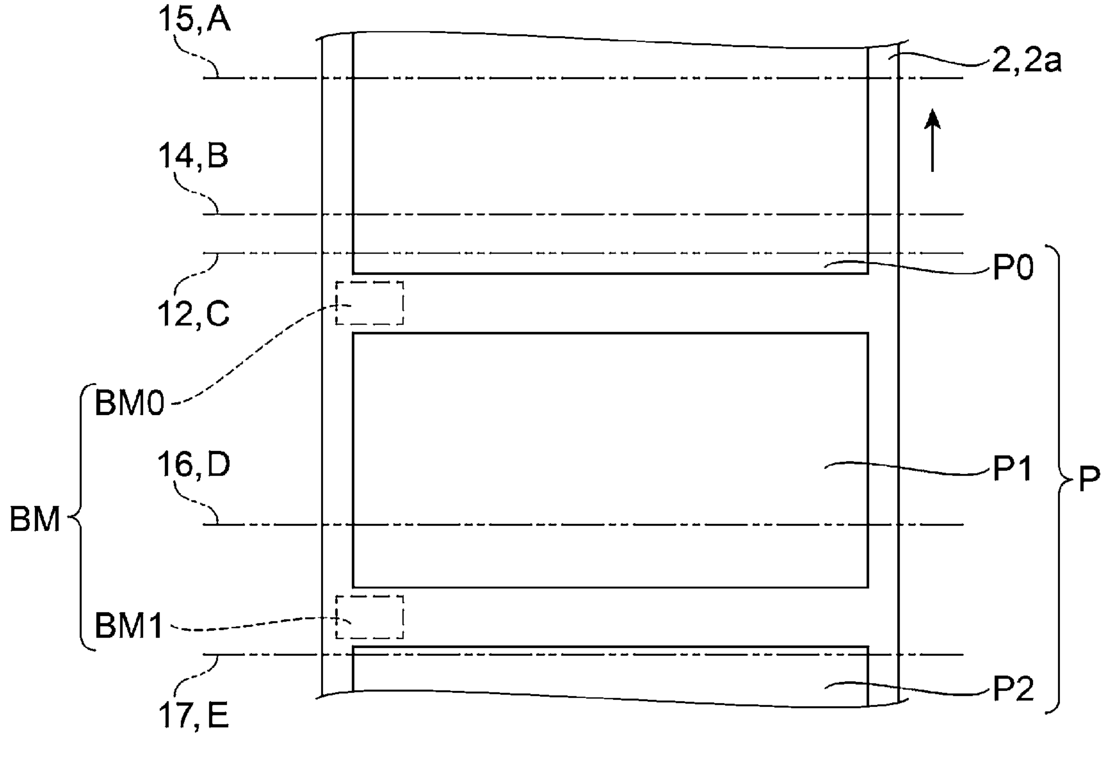
FIG. 4 is a schematic diagram illustrating the positional relationship between the recording paper that has changed its position and each component.

FIG. 4 illustrates the positional relationship between the recording paper 2 that has changed its position and each component after the user closes the cover to accommodate the roll paper R in the holder 23, or the like. An arrow in FIG. 4 denotes the transport direction. It is assumed that a print area P0, a print area P1, and a print area P2 are located in the print area P from the downstream to the upstream in the transport direction. Also, it is assumed that regarding the marks BM, a mark BM0 and a mark BM1 are located from the downstream to the upstream in the transport direction.

As illustrated in FIG. 4, the end of the print area P0, which is downstream in the transport direction, has a position beyond the position C of the head 12. Accordingly, it is not possible for the head 12 to print in the print area P0 with a targeted fixed size.

As described above, when the controller 10 detects the recording paper 2 by using the first sensor 15 at the time of startup, or when the controller 10 detects opening or closing of the cover 21 by using the cover sensor 18, it is possible for the controller 10 to determine that the position of the recording paper 2 has been changed. Since the position of the recording paper 2 has been changed, it is possible for the controller 10 to determine that printing in the print area P0 with a targeted fixed size is not possible. In this regard, in the same manner as in FIG. 3, since the third sensor 17 has detected the recording paper 2 at the position E, the controller 10 does not yield an error, and performs processing on the recording paper 2.

The controller 10 causes the transport roller 13 to transport the recording paper 2 so that the head 12 prints from the end of the print area P1, which is the next print area to the print area P0. At this time, the controller 10 transports the recording paper 2 by using the transport roller 13 while detecting a mark BM of the recording paper 2 by using the second sensor 16. The mark BM0 already has a position beyond the position D of the second sensor 16. Accordingly, the second sensor 16 tries to detect the next mark BM1.

In this regard, it is possible for the controller 10 to transport the recording paper 2 in the direction opposite to the transport direction by using the transport roller 13 in order to print in the print area P0 having a position that is already beyond the position C of the head 12. However, it is not possible for the controller 10 to find the end position of the recording paper 2 when the position of the recording paper 2 has been changed. The controller 10 therefore might return back the recording paper 2 too much in the opposite direction, and the recording paper 2 might get out of the state of being pressed between the head 12 and the transport roller 13. When the recording paper 2 gets out from the position of the head 12 and the transport roller 13, it is not possible for the transport roller 13 to transport the recording paper 2. Accordingly, when the recording paper 2 is located at the position illustrated in FIG. 4, the controller 10 transports the recording paper 2 in the transport direction by using the transport roller 13.

When the recording paper 2 is transported by the transport roller 13, the second sensor 16 detects the end of the mark BM1. When the second sensor 16 detects the end of a mark BM1, the controller 10 further transports the recording paper 2 by using the transport roller 13 for a transport amount half the length of the mark BM1 in the transport direction. After that, the controller 10 stops the transport roller 13.

As a result, the recording paper 2 is located at the position illustrated in FIG. 3. The controller 10 cuts the recording paper 2 at the position B by using the cutter 14. The cut recording paper 2 is discharged from the discharge opening 24. Therefore, there is no recording paper 2 at the position A of the first sensor 15, and thus the first sensor 15 does not detect the recording paper 2. The head 12 is located at the position C having the margin M from the end of the print area P1, and thus has a position to start printing in the print area P1.

Here, a specific description will be given of the control that the controller 10 performs to cause the transport roller 13 to transport the recording paper 2 from the position illustrated in FIG. 4 to the position illustrated in FIG. 3. The storage section 11 stores the positional information of the components, which is the information on the respective positional relationships among the position E of the third sensor 17, the position D of the second sensor 16, the position C of the head 12, the position B of the cutter 14, and the position A of the first sensor 15 in the transport direction. Also, the storage section 11 stores the positional information of the recording paper 2, which is the information on the positional relationships among the mark BM, the print area P, and the margin M.

The controller 10 transports the recording paper 2 by using the transport roller 13, and detects the end of the mark BM by using the second sensor 16. It is possible for the controller 10 to read the positional information on the components and the positional information on the recording paper 2 from the storage section 11, and to determine or calculate the individual positions using the detected position of the end of the mark BM of the recording paper 2 as a reference. It is possible for the controller 10 to transport the recording paper 2 by using the transport roller 13 based on the detected position of the end of the mark BM of the recording paper 2 as a reference, and to transport the recording paper 2 to the targeted position with respect to the components.

For example, the controller 10 transports the recording paper 2 from the state illustrated in FIG. 4 by using the transport roller 13. When the controller 10 detects the position of the end of the mark BM1 on the recording paper 2 by using the second sensor 16, the controller 10 transports the recording paper 2 such that the position with the margin M from the end of the print area P1 reaches the position C of the head 12 by using the position as a reference. It is possible for the head 12 to start printing from the position disposed from the end of the print area P1 on the recording paper 2 with the margin M. Also, it is possible for the controller 10 to transport the recording paper 2 from the state illustrated in FIG. 4 by using the detected position of the end of mark BM1 of the recording paper 2 as a reference by using the transport roller 13 so that the position of the mark BM1 reaches the position B of the cutter 14 as illustrated in FIG. 3. As illustrated in FIG. 3, it is possible for the cutter 14 to cut the recording paper 2 at the position of the mark BM1, which is between the print area P0 and the print area P1 on the recording paper 2.

It is possible to set the length of the print area P on the recording paper 2 in the transport direction and the interval of the mark BM to any values. In the example in FIG. 3, when the position of the end of the print area P1 with the margin M is at the position C of the head 12, the position of the mark BM1 is at the position B of the cutter 14, and the position of the mark BM2 is at the position D of the second sensor 16. However, the positions of the mark BM1 and the mark BM2 may not be the respective positions illustrated in FIG. 3, and the print area P1 may not be in the range illustrated in FIG. 3. Since it is possible for the controller 10 to determine the position of the print area P to be printed by the head 12 and the position of the recording paper 2 to be cut by the cutter 14 by using the detected position of the end of the mark BM on the recording paper 2 as a reference, it is possible to print and cut the recording paper 2 at a target position.

As described with reference to FIG. 4, when the controller 10 detects the recording paper 2 by using the first sensor 15 at the time of startup or when the controller 10 detects opening and closing of the cover 21 by using the cover sensor 18, it is possible for the controller 10 to determine that the position of the recording paper 2 has been changed as illustrated in FIG. 4. At this time, the controller 10 performs the cue operation on the recording paper 2 to transport the recording paper 2 to the cue position illustrated in FIG. 3 by using the transport roller 13.

After that, the controller 10 waits until the communication section 19 receives print data. This state is referred to as a so-called standby state. When the communication section 19 receives print data, the controller 10 starts printing of the print data from the cue position of the recording paper 2 by using the head 12. As a result, it is possible for the printer 1 to print printed matter with a fixed size in the print area P1 of the recording paper 2.

On the other hand, as described with reference to FIG. 3, when the controller 10 does not detect the recording paper 2 by using the first sensor 15, it is possible for the controller 10 to determine that the position of the recording paper 2 has not been changed. Unlike the case described with reference to FIG. 4, the controller 10 does not transport the recording paper 2 by using the transport roller 13. In this case, the controller 10 does not waste the recording paper 2.

1.2 Printer Control Method

Figure 5:
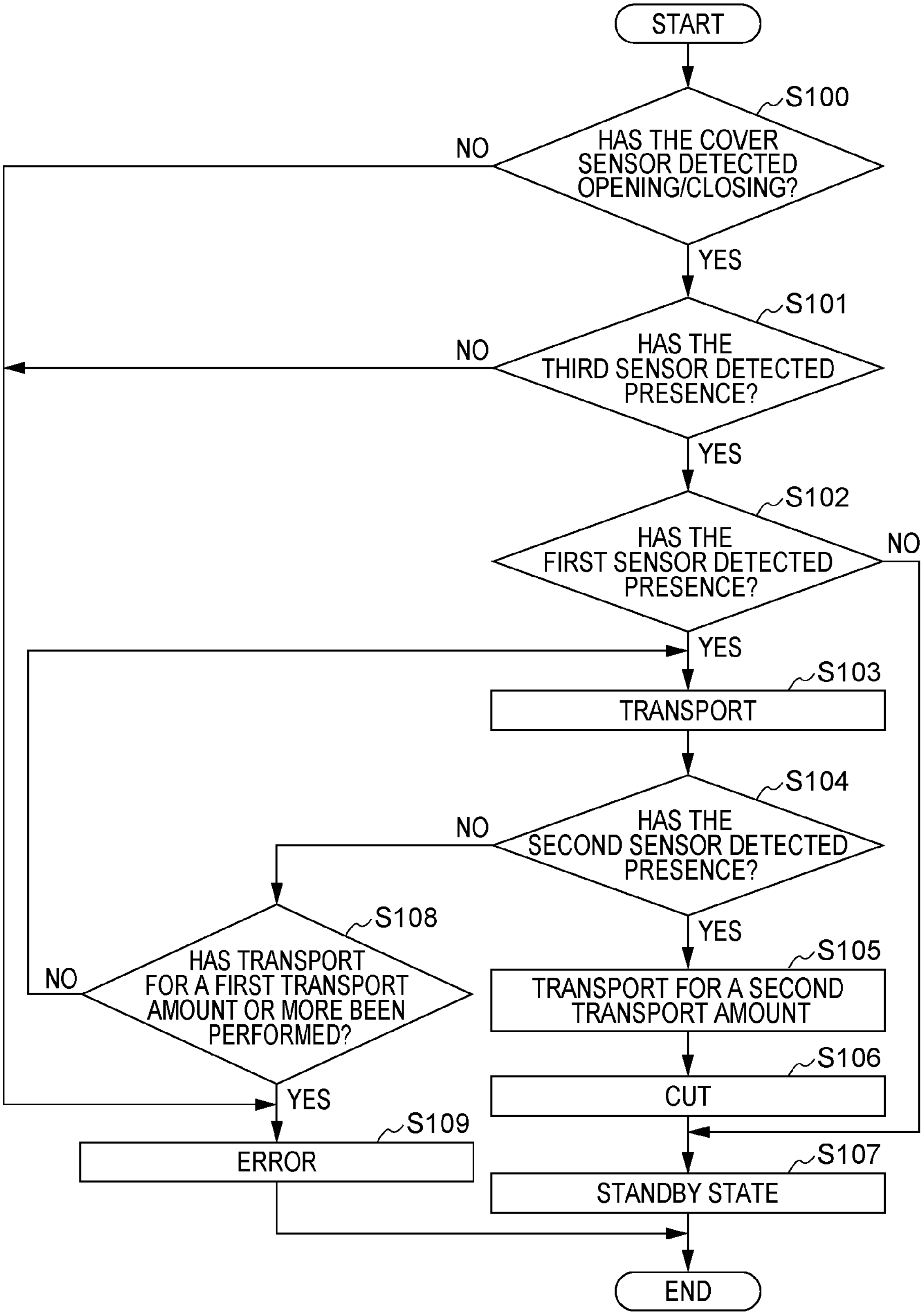
FIG. 5 is a flowchart illustrating the control method of the printer.

When the power switch is turned on, and thus the power is supplied to the printer 1, the printer 1 is started, and the controller 10 of the printer 1 starts controlling. As illustrated in FIG. 5, the controller 10 determines whether or not the cover sensor 18 has detected opening/closing (S100). When the controller 10 determines that the cover sensor 18 has detected opening/closing (S100: YES), and that the cover 21 is closed, the controller 10 determines whether or not the third sensor 17 has detected presence of the recording paper 2 (S101).

On the other hand, when the controller 10 determines that the cover sensor 18 has no detection (S100: NO), and that the cover 21 is open, the controller 10 yields an error (S109). At this time, the controller 10 transmits error information stating that the cover 21 is open to an external device by using the communication section 19. The controller 10 may notify error information stating that the cover 21 is open by using a notification device not illustrated in the figure, such as a display device, a speaker, or the like. The controller 10 then ends the processing.

When the controller 10 determines that the third sensor 17 has detected presence of the recording paper 2 (S101: YES), and there is the recording paper 2 at the position E of the third sensor 17 in the printer 1, the controller 10 determines whether or not the first sensor 15 has detected presence of the recording paper 2 (S102).

In this regard, when the controller 10 determines that the third sensor 17 has no detection (S101: NO), and there is no recording paper 2 at the position E of the third sensor 17 in the printer 1, the controller 10 yields an error (S109). At this time, the controller 10 transmits error information stating that there is no recording paper 2 in the printer 1 to an external device by using the communication section 19. The controller 10 may notify the error information by using a notification device. The controller 10 then ends the processing.

When the controller 10 determines that the first sensor 15 has no detection (S102: NO), and that there is no recording paper 2 at the position A of the first sensor 15, the controller 10 changes to a standby state for receiving print data by using the communication section 19 (S107). The controller 10 then ends the processing. When the controller 10 determines that there is no recording paper 2 at the position A of the first sensor 15, it is possible for the controller 10 to determine that the position of the recording paper 2 has not been changed, and thus to determine that recording paper 2 is located at the position illustrated in FIG. 3. That is to say, it is possible for the controller 10 to determine that the head 12 is located at the position C having the margin M from the end of the print area P1, and thus starting to print in the print area P1 is possible. That is to say, it is possible for the controller 10 to determine that the recording paper 2 is at the cue position. The controller 10 does not transport the recording paper 2 by using the transport roller 13, and does not cut the recording paper 2 by using the cutter 14. In this regard, when the controller 10 receives print data from the communication section 19 in the standby state, the controller 10 performs printing on the recording paper 2.

On the other hand, when the controller 10 determines that the first sensor 15 has detected presence of the recording paper 2 (S102: YES), and that there is the recording paper 2 at the position A of the first sensor 15, the controller 10 transports the recording paper 2 in the transport direction by using the transport roller 13 (S103). When the controller 10 determines that the recording paper 2 is located at the position A of the first sensor 15, it is possible for the controller 10 to determine that the position of the recording paper 2 has been changed as illustrated in FIG. 4. That is to say, it is possible for the controller 10 to determine that the recording paper 2 is not at the cue position. Accordingly, the controller 10 performs the cue operation on the recording paper 2, and transports the recording paper 2 to the cue position illustrated in FIG. 3 by using the transport roller 13.

In order to perform the cue operation, the controller 10 transports the recording paper 2 by using the transport roller 13 (S103) while determining whether or not the second sensor 16 has detected presence (S104). When the controller 10 determines that the second sensor 16 has detected presence of the recording paper 2 (S104: YES), and that the end of the mark BM on the recording paper 2 has reached the position D of the second sensor 16, the controller 10 transports the recording paper 2 for a second transport amount by using the transport roller 13 (S105). The second transport amount is a transport amount that the controller 10 transports the recording paper 2 from when the end of the mark BM on the recording paper 2 reaches the position D of the second sensor 16 to when the recording paper 2 reaches the cue position. For example, in the case described above in FIG. 4, the second transport amount is a transport amount half the length of the mark BM1 in the transport direction. After that, the controller 10 stops the transport roller 13.

As a result, the recording paper 2 is located at the position illustrated in FIG. 3, which is the cue position. The controller 10 cuts the recording paper 2 at the position B by using the cutter 14 (S106). The cut recording paper 2 is discharged from the discharge opening 24. At this time, there is no recording paper 2 at the position A of the first sensor 15, and thus the first sensor 15 does not detect the recording paper 2. The head 12 is located at the position C with the margin M from the end of the print area P1, which is the position to start printing in the print area P1. The controller 10 changes to the standby state (S107), and ends the processing. In this regard, when the controller 10 receives print data from the communication section 19 in the standby state, the controller 10 performs printing on the recording paper 2.

When the controller 10 is transporting the recording paper 2 by using the transport roller 13 (S103), and the second sensor 16 has no detection (S104: NO), the controller 10 determines whether or not the recording paper 2 has been transported for a first transport amount or more (S108). When the controller 10 determines that the recording paper 2 has not been transported for the first transport amount or more (S108: NO), the controller 10 continues to transport the recording paper 2 by using the transport roller 13 (S103). That is to say, when the controller 10 detects the mark BM1 by using the second sensor 16 while transporting the recording paper 2 by using the transport roller 13 for a transport amount in the range less than the first transport amount (S104: YES), the controller 10 transports the recording paper 2 by using the transport roller 13 for a second transport amount as described above (S105), and locates the recording paper 2 at the cue position.

On the other hand, when the controller 10 determines that the recording paper 2 has been transported for the first transport amount or more (S108: YES), the controller 10 yields an error (S109). The first transport amount is, for example, an amount larger than the length from the mark BM0 to the mark BM1 in the transport direction. The length from the mark BM0 to the mark BM1 is less than the first transport amount, and thus the second sensor 16 ought to detect the mark BM1 originally until the recording paper 2 is transported for the first transport amount by using the transport roller 13.

When the second sensor 16 fails to detect the mark BM1 even though the controller 10 has transported the recording paper 2 for the first transport amount or more, it is possible for the controller 10 to determine that abnormality on the recording paper 2 has occurred. This is caused by the case in which, for example, the recording paper 2 without a mark BM, such as the mark BM1, or the like is set, or a so-called paper jam, in which the recording paper 2 gets stuck in the transport roller 13, or the like has occurred, or the like. Accordingly, the controller 10 determines that abnormality on the recording paper 2 has occurred, and yields an error (S109). The controller 10 stops the transport roller 13. The controller 10 then transmits error information stating that wrong recording paper 2 is set in the printer 1, or a paper jam has occurred to an external device by using the communication section 19. The controller 10 may notify the error information by using a notification device. After that, the controller 10 ends the processing.

In this regard, when the storage section 11 stores setting information, the controller 10 may perform the control illustrated in FIG. 5. Specifically, the controller 10 refers to the storage section 11, and when the storage section 11 stores setting information, the controller 10 starts the first control of determining whether or not the cover sensor 18 has detected opening/closing (S100). When the storage section 11 stores setting information, in a case in which the controller 10 detects that the cover 21 has been closed by using the cover sensor 18, it is possible for the controller 10 to detect the recording paper 2 by using the first sensor 15. When the storage section 11 stores setting information, it is possible for the controller 10 to perform the cue operation including these. On the other hand, when the storage section 11 does not store the setting information, the controller 10 does not perform a series of control from the determination of detection by using the cover sensor 18 (S100).

It is possible for the controller 10 to cause the storage section 11 to store setting information based on a command received from the communication section 19. Alternatively, by using an input device not illustrated in the figure and disposed on the printer 1, such as a touch panel, or the like, the controller 10 may cause the storage section 11 to store the setting information. In this manner, it is possible for the user to select whether or not the storage section 11 stores the setting information, and thus it is possible for the controller 10 to select whether or not to perform the cue operation based on the setting information.

Also, the controller 10 may perform the control illustrated in FIG. 3 even after startup. For example, the controller 10 may yield an error (S109), end the processing, and then return to the beginning to continue from the control of determining whether or not the cover sensor 18 has detected opening/closing (S100). A user who got error information might have eliminated the cause of the error.

For example, a user sometimes finds error information stating that the cover 21 is open at the time of starting the printer 1, and closes the cover 21. Even when the controller 10 yields an error at startup once (S109), it is possible for the controller 10 to determine whether or not the cover sensor 18 has detected opening/closing after that (S100). When the controller 10 determines that the cover 21 is closed, it is possible for the controller 10 to continue from the control of determining whether or not the next third sensor 17 has detected presence (S101). When the controller 10 then determines that the error has been eliminated, the controller 10 may transmit normal information stating that the error has been eliminated, and thus the printer 1 returns to a normal state to an external device by using the communication section 19, or may notify the normal information by using a notification device.

In the printer 1 according to the embodiment described above, the first sensor 15 is disposed downstream of the cutter 14 in the transport direction. When the first sensor 15 does not detect the recording paper 2, the controller 10 determines that the position of the recording paper 2 has not been changed, and does not transport the recording paper 2 by using the transport roller 13. That is to say, the controller 10 does not perform the cue operation. As a result, it is possible for the printer 1 to suppress wasting of the recording paper 2 at every startup.

In the above, the detailed description has been given of the embodiments with reference to the drawings. However, a specific configuration is not limited to these embodiments, and modification, replacement, deletion, and the like may be made without departing from the spirit and scope of this disclosure.

The description has been given of the example using a thermal head for the head 12. However, any printing method may be used. For example, the head 12 may be an ink jet head. In this case, it is not possible for the ink jet head to have contact with the transport roller 13 to press the recording paper 2, and thus a driven roller that presses the recording paper 2 facing the transport roller 13 ought to be disposed on the case 20.

The description has been given of the second sensor 16 by using an example of a reflective optical sensor. However, the second sensor 16 may be a transmissive optical sensor. In the case of a transmissive optical sensor, a light emission section and a light reception section ought to be mounted on the cover 21 and the case 20 respectively. It is possible for a transmissive optical sensor to detect that detection light passes through the backing paper between the die-cut labels, and thus to use this instead of the mark BM. Also, in the case of a die-cut label, a peeling mechanism that peels a label from the backing paper may be disposed at the discharge opening 24 instead of the cutter 14.

What is claimed is:

1. A printer comprising:

a transport roller for transporting recording paper in a transport direction;

a head for printing on the recording paper;

a cutter disposed downstream of the head in the transport direction and configured to cut the recording paper;

a first sensor disposed downstream of the cutter in the transport direction and configured to detect the recording paper;

a communication section configured to receive print data; and a controller, wherein the controller detects, by the first sensor, the recording paper at least at startup, when the recording paper is detected, the controller causes the transport roller to transport the recording paper and causes the cutter to cut the recording paper, whereas when the recording paper is not detected, the controller causes the transport roller not to transport the recording paper and causes the cutter not to cut the recording paper, and when the communication section receives the print data, the controller causes the head to print on the recording paper.

2. The printer according to claim 1, further comprising:

a holder configured to accommodate roll paper having the recording paper wound thereon;

a cover configured to open and close the holder; and a cover sensor configured to detect opening and closing of the cover, wherein when the cover sensor detects closing of the cover, the controller detects, by the first sensor, the recording paper.

3. The printer according to claim 2, further comprising:

a storage section configured to store setting information, wherein when the storage section stores the setting information, in a case in which the controller detects, by the cover sensor, closing of the cover, the controller detects, by the first sensor, the recording paper.

4. The printer according to claim 1, further comprising:

a plurality of marks being attached on the recording paper; and a second sensor configured to detect one of the marks, wherein when the first sensor detects the recording paper, the controller detects, by the second sensor, one of the marks while the recording paper is transported by the transport roller, and when the second sensor detects one of the marks in a range less than a first transport amount, the controller causes the transport roller to transport the recording paper for a second transport amount.

5. The printer according to claim 1, further comprising:

a third sensor disposed upstream of the head in the transport direction and configured to detect the recording paper, wherein when the recording paper is not detected by the third sensor, the controller yields an error.

6. A method of controlling a printer including a transport roller for transporting recording paper in a transport direction, a head for printing on the recording paper, a cutter disposed downstream of the head in the transport direction and configured to cut the recording paper, a first sensor disposed downstream of the cutter in the transport direction and configured to detect the recording paper, and a communication section configured to receive print data, the method comprising:

detecting the recording paper by the first sensor at least at startup of the printer, when the recording paper is detected, transporting the recording paper and cutting the recording paper, whereas when the recording paper is not detected, not transporting the recording paper and not cutting the recording paper, and when the print data is received, printing on the recording paper.

* * * * *